(12) United States Patent
Smith et al.

(10) Patent No.: US 6,514,312 B2
(45) Date of Patent: Feb. 4, 2003

(54) STEELMAKING SLAG CONDITIONER AND METHOD

(75) Inventors: Colvin W. Smith, Caton, MD (US); John D. Lynn, Venter Valley, PA (US); Richard V. Fekete, Edgewood, MD (US)

(73) Assignee: Bethlehem Steel Corporation

( * ) Notice: Subject to any disclaimer, the term of this patent is extended or adjusted under 35 U.S.C. 154(b) by 0 days.

(21) Appl. No.: 09/725,739

(22) Filed: Nov. 29, 2000

(65) Prior Publication Data

US 2002/0062715 A1 May 30, 2002

(51) Int. Cl.[7] .................................................. C22B 7/02
(52) U.S. Cl. .............................. 75/560; 75/751; 264/30; 266/44
(58) Field of Search ........................... 264/30; 266/44, 266/281; 75/751, 320, 314, 313, 560

(56) References Cited

U.S. PATENT DOCUMENTS

| | | | |
|---|---|---|---|
| 5,435,832 A | 7/1995 | Kepplinger et al. | 75/500 |
| 5,435,835 A * | 7/1995 | Lynn et al. | 75/772 |
| 5,439,505 A | 8/1995 | Krofchak | 75/773 |
| 5,554,207 A | 9/1996 | Bogdan et al. | 75/500 |
| 5,573,576 A | 11/1996 | Krofchak | 75/773 |
| 5,772,931 A * | 6/1998 | Farrand | 266/281 |
| 5,776,226 A | 7/1998 | Edlinger | 75/500 |
| 5,785,737 A | 7/1998 | Lynn et al. | 75/751 |
| 5,855,645 A | 1/1999 | Myerson et al. | 75/419 |
| 5,871,561 A | 2/1999 | Okada et al. | 75/658 |
| 5,992,335 A | 11/1999 | Nakamura et al. | 110/342 |
| 6,085,672 A | 7/2000 | Nakamura et al. | 110/219 |

* cited by examiner

Primary Examiner—Melvyn Andrews

(57) ABSTRACT

A slag conditioner for extending the life of a BOF vessel lining utilizing recycled blast furnace filter cake dewatered by contact with a hot slag; its process of production, and method of use.

11 Claims, 1 Drawing Sheet

STEELMAKING SLAG CONDITIONER AND METHOD

FIELD OF THE INVENTION

Figure 1:
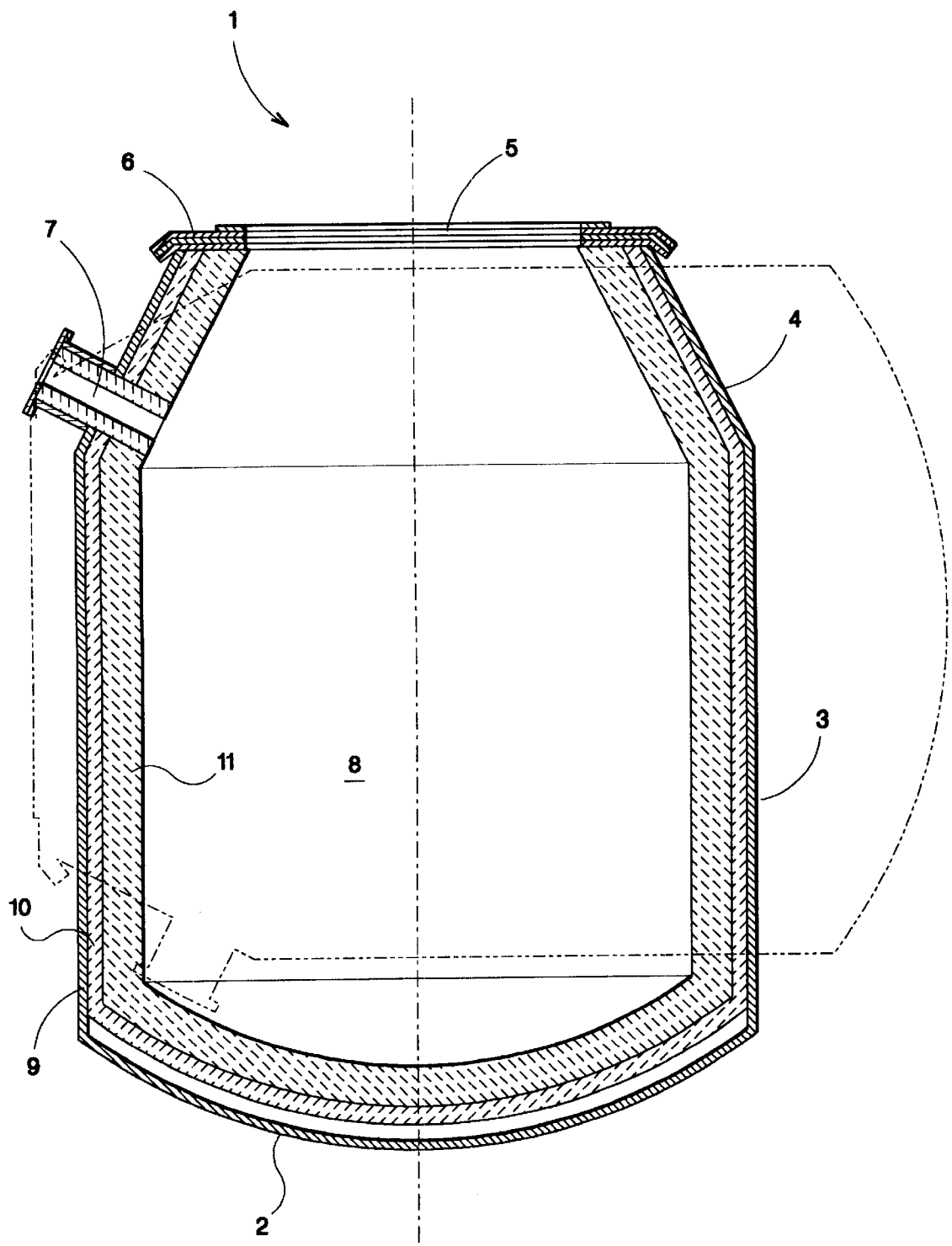

The present invention relates to the use of slag conditioners in steelmaking operations. The invention further relates to the use of slag conditioners to protect the basic oxygen furnace vessel linings used in a steelmaking operation and thus increase the life span of the BOF vessel lining. In particular, the present invention is directed to the use of recycled materials as slag conditioners to reduce the amount of raw materials needed and the amount and costs of waste disposal.

BACKGROUND OF THE INVENTION

Historically, steel production utilizes blast furnace iron and a scrap charge in a Basic Oxygen Furnace ("BOF") or scrap melting in an electric arc furnace to produce steel for rolling or other processing into manufacturing stock. The BOF vessel is lined with a refractory coating that protects the steel wall of the furnace shaped vessel from the molten steel during the refining process. The refractory brick lining eventually wears away due to the constant bombardment from scrap charging and the corrosive nature of the molten steel-slag combination. Once the coating has eroded, it is necessary to reline the BOF vessel, which requires a shutting down of the steelmaking process at a significant cost of time and money. Thus, any increase in the life span of the refractory lining can greatly increase the efficiency and profitability of the steelmaking operation over the course of time.

One way to maintain the refractory walls of the furnace is through a process known as slag splashing in which a lance is used to blow an inert gas toward the slag layer. This causes the slag to be splashed upwardly onto the refractory walls and to coat portions of the refractory walls that have been worn. The slag cools on the refractory walls, effectively repairing worn portions of the walls. However, the slag splashing process can create other problems such as increasing build-up at the cone of the furnace of a mixture of molten metal and oxides, commonly known as skull. The formation of skull at the cone of the BOF is undesirable because it restricts the ability to lower lances and charge scrap into the cone of the furnace.

In the steelmaking process, fluxing agents or slag conditioners are often employed not only to provide consistency and/or viscosity to coat the BOF vessel during the slag splashing step but also to condition the molten slag layer to aid in the removal of impurities. Slag conditioners can also be used to promote the extraction of impurities from the molten metal bath and to further provide reactive substances for combining with impurities such as sulfur and phosphorus that migrate to and can be effectively extracted with the resultant slag layer.

The basic flux employed in iron and steel-making operations is lime or limestone, and particularly, "burnt lime" (CaO), which is effective to provide consistency/viscosity to coat the BOF vessel during the slag splashing step and to condition the molten slag upon dissolution therein. Sometimes lesser amounts of supplemental slag conditioners and fluxing agents such as fluorspar ($CaF_2$) are utilized for increasing the fluidity of the slag and to further enhance the rate of dissolution of the lime and its chemical reactivity with the impurities present. However, the various prior art slag conditioning agents used to date have problems including reduced effectiveness and/or their relatively high cost and/or the difficulty associated in their handling and control of the chemistry of the molten bath.

An additional problem is that during the steelmaking process, large quantities of various waste materials containing iron bearing dusts and sludges are generated from pollution control devices such as bag houses, precipitators, cyclones, scrubbers, dust collectors, and the like. These waste materials are typically disposed of in a landfill due to the residual metal content that precludes their use in steelmaking operations. Currently, environmental regulations require the cleaning of these waste materials before disposal to remove these residual metals, such as zinc, lead and the like. These residuals metals can often be found in their oxide forms. However, de-zincing and other residual metal removal operations require a high capital expenditure for the necessary and complex equipment required to comply with these environmental regulations. For example, hydrocycloning can be used for de-zincing. However it is costly, and results in a zinc bleed that requires stabilization and landfill disposal. As described in U.S. Pat. No. 5,871,561, the zinc can be evaporated from a dust by heating under substantial vacuum in a furnace for 6 to 10 hours. Again, the capital equipment costs, time required, and the possibility of environments mishaps are high.

SUMMARY OF THE INVENTION

In accordance with the present invention, it has been found that residual metal containing waste material such as blast furnace filter cake (BFFC) can be used with considerable advantage in various facets of iron making and steelmaking processes.

In particular, the blast furnace filter cake and other residual metal containing waste materials can be utilized in a slag conditioner in the basic oxygen furnace of a steelmaking operation not only to reduce the amount of waste generated, but also, unexpectedly, to increase the life of the BOF vessel lining. This increased life allows a greater number of heats per lining cycle of the BOF vessel, thus reducing downtime, and increasing the efficiency of the steelmaking operation. This also results in recycling of residual metal containing waste materials in the steelmaking process, thus rendering the steelmaking process more environmentally friendly and decreasing the costs associated with cleaning and disposal of the waste material.

The BFFC is dewatered by admixing it with hot BOF slag for a period of time to allow the hot slag to cause water vaporization and reduce the moisture content of the BFFC/slag admixture to about 4% by weight. The resultant dewatered BFFC/slag admixture is utilized as a slag conditioner without the need for any binders or agglomerating agents or without the need to form briquettes or particles.

These and other objects and advantages of the present invention will be readily apparent in view of the following description and drawings.

DRAWING

FIG. 1 is cross-sectional view of a typical BOF vessel showing the vessel lining.

DETAILED DESCRIPTION OF THE INVENTION

The present invention is directed to the use of a slag conditioner containing recycled waste materials to extend the life of the refractory lining of a BOF vessel. This significantly defers the time periods between repair and/or replacement of the lining, thus significantly increasing the efficiency of the steelmaking operation.

A typical BOF vessel is illustrated generally at 1 in FIG. 1, and is shown rotated to a substantially horizontal position from a normal vertical melting position. As is well known in the art, vessel 1 is composed of a generally rounded bottom 2 surmounted by a cylindrical barrel or body section 3. The upper portion of body 3 narrows inwardly in the cone section 4. The interior surface of the barrel section 3 opposite the tap hole 7 is generally referred to as the charge pad. The uppermost end of cone section 4 is provided with a round opening 5 permitting the charge to be introduced into the furnace vessel. The perimeter of opening 5 may be provided with a reinforced lip as at 6. A tap hole 7 extends at an angle through the sidewall of the cone section 4 and communicates with the interior 8 of the furnace vessel. The interior surface of the barrel section 3 immediately below tap hole 7 is generally referred to as the tap pad.

The wall of vessel 1 is formed from three concentrically positioned shells. The outermost shell 9 is generally fabricated from steel, and it provides mechanical integrity for the furnace vessel. A safety lining 10 is provided immediately inwardly adjacent the steel shell 9. Typically, safety lining 10 will be fabricated from a refractory material such as fired magnesite brick. Finally, the innermost working lining 11 is typically fabricated from a suitable refractory material such as pitch-impregnated magnesite brick in the cone section 4 and tempered pitch-bonded magnesite brick in the bottom section 2. Together, safety lining 10 and working lining 11 are approximately three feet thick and protect the steel wall or shell 9 of the furnace vessel from the molten steel during the refining process.

In typical operation, the refractory brick forming working lining 11 eventually wears or erodes away due to the constant bombardment from scrap charging and the corrosive nature of the molten steel-slag combination. In general, the lining does not wear evenly, but some areas that are subjected to more abuse may show higher wear.

For example, an initial working lining thickness of about 36 inches (1 meter) would erode to the safety lining 10 after perhaps 800 heats. Many efforts have been made to extend the lifetime of the lining 11 since not only is the lining expensive to replace, it also takes the BOF vessel off the production line for the period needed to replace the lining. Efforts in the prior art have included slag splashing and/or intensive application of spray material on the worn areas to try to extend the vessel lining. However, this requires careful monitoring of the wear of selected areas of the interior of the furnace vessel, and the down time associated with cooling the vessel so that the working lining can be patched with refractory gunning material between heats to extend the time when the entire working lining must be replaced. Commonly, to minimize the erosion of the lining, spray material can be applied as often as every third heat.

It has now been discovered that a slag conditioner made from recycled waste materials in the steelmaking operation not only reduces the use of raw materials in the steelmaking process and the amount of waste to be disposed of, but also unexpectedly extends the life of the refractory lining in a BOF vessel.

In a preferred embodiment, the recycled waste materials in the slag conditioner include a blast furnace filter cake (BFFC) that represents the dewatered solids collected from the blast furnace gas cleaning wet scrubber system. The BFFC consists essentially of coke and iron oxides, but has a residual metals content, primarily zinc, that in the past has precluded its use in the steelmaking blast furnace operation. If scrap material is utilized, then other residual metals, such as lead, may also be present.

The BFFC can be dewatered by any suitable means. Using prior art sludge drying operations can be extremely energy intensive in that large amounts of energy must be consumed to generate sufficient heat for vaporizing the water in the sludge. In an embodiment of the invention, heat from the steelmaking operation is recycled and used in the dewatering operation. In a preferred embodiment of the invention, admixture with a moderately hot slag, preferably at a temperature below the molten liquid state, provides a free heat source that can be combined with the wet BFFC to vaporize the water and lower the moisture content of the sludge. The slag preferably contains up to 30% CaO, and performs similarly to the limestone.

Dewatering of the wet BFFC is most preferably conducted by admixing with hot BOF slag for a period of time to allow the hot slag to cause water vaporization and reduce the moisture content of the BFFC/slag admixture to about 4% by weight.

In a preferred embodiment of the invention, the process used in U.S. Pat. No. 5,785,737, which is hereby incorporated by reference, is used to mix the moderately hot slag with the wet BFFC to form a hot slag/wet BFFC mixture. The preferred and most convenient method for combining the hot slag and wet BFFC is to blend alternating batches in the preferred ratio of 1 part of slag to 2 parts of BFFC to produce the preferred 1:2 slag/BFFC mixture ratio.

To avoid rapid steam generation, the hot slag and wet BFFC should be carefully blended. This can be achieved by combining the materials into a stratum comprising alternating 1–2 feet thick layers of slag and wet BFFC to allow safe evolution of steam and uniform dewatering of the BFFC. Reclaiming the layered pile after curing for about 16 hours results in a uniform blend of the two materials suitable for any down stream processing, i.e., crushing screening, and/or magnetic separation. This procedure is readily done with front end loader bucket used at most slag processing sites in the steel industry.

In one embodiment of the invention, the BFFC/slag mixture is allowed to rest or cure for an extended time period to enable the radiant energy emitted from the hot slag to vaporize water in the sludge, and reduce the total water content of the mixture to preferably about 4% by weight. The water content of the BFFC/slag mixture can be monitored by any suitable means known to one of ordinary skill in the art, such as meters, to determine when the moisture content of the mixture is at the desired level. A rest or cure for a time period of up to about 16 hours generally is sufficient to vaporize enough water to reduce the moisture content to about a 4% moisture level.

The resultant dewatered BFFC/slag admixture is then ready for use as a slag conditioner without the need for any binders or agglomerating agents or without the need for further processing to form briquettes or particles. As a result of the process, the molten slag is conditioned, and the contained iron oxides are partially reduced, allowing for down stream recovery by magnetic separation in the cold slag processing operation.

The dewatered BFFC/slag admixture is added to the BOF vessel immediately after tapping, and is introduced directly into the remaining molten slag. Any conventional equipment can be used to transport the BFFC/slag admixture to the BOF vessel including the existing bin system. It has been discovered that the use of the above-described blend of BFFC and slag as a slag conditioner is able to affect the consistency/viscosity of the slag, maximizing the efficiency of the slag splashing as achieved by other typical slag conditioners such as limestone. Assuming a blend of one third slag and two-thirds BFFC, this amounts to approximately one and a third tons of BFFC per heat. At 40 heats per day over 50 tons are consumed, which is about 70% of the BFFC generated, similar to the hydrocyclone recycling process. In one embodiment of the invention, up to about 6,000 lbs. of the slag conditioner is used per heat in a conventional steel BOF, and in a more preferred embodiment of the invention, about 2,000 lbs. up to about 6,000 lbs. of the slag conditioner is used per heat in a conventional steel BOF.

It must be remembered that slag additions reintroduce removed impurities back into the steelmaking vessel. For example, in most instances, phosphorus is considered detrimental with respect to the quality of steel products. Metallurgists attempt to entrap phosphorus, and other impurities, within the slag cover that floats on the surface of the molten steel bath contained in a steelmaking vessel. These impurities are removed from the molten steel as the slag is systematically tapped. Thus, various undesirable elements and compounds could potentially be inadvertently introduced into the recycling stream used to create the slag conditioner of the present invention. Thus, one of ordinary skill in the art would know to avoid introducing undesirable impurities into the finished steel product by taking care to monitor the content of the slag conditioner for any materials that could adversely impact the finished steel product.

It should be understood that this process in not limited to steelmaking operations. Any hot dross can be used as a heat source to dehydrate wet filter cake produced in any metal refining or smelting operation, and that such dross/filter cake mixtures can be recycled back into their respective refining or smelting operations.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

We claim:

1. A process for producing a slag conditioner for extending the life of a BOF vessel, said process comprising the steps of:

obtaining wet blast furnace filter cake from a blast furnace filtering system;

adding hot slag to provide a blast furnace filter cake/slag mixture; and dewatering said blast furnace filter cake by allowing said blast furnace filter cake/slag mixture to rest for a period sufficient to enable radiant energy emitted from said hot slag to vaporize water in said wet blast furnace filter cake to produce a slag conditioner with a moisture content of approximately 4% by weight.

2. The process of claim 1 wherein said dewatering time period is at least 16 hours.

3. The process of claim 1 further comprising adding said slag conditioner to said BOF vessel after said vessel has been tapped.

4. A method of extending the life of a BOF vessel, said method comprising adding a slag conditioner to said BOF vessel after tapping of the BOF vessel, said slag conditioner comprises a dewatered blast furnace filter cake.

5. The method of claim 4 wherein said dewatered blast furnace filter cake is produced by contacting wet blast furnace filter cake with hot slag for a period sufficient to obtain a moisture content of about 4% by weight.

6. The method of claim 4 wherein said blast furnace filter cake comprises coke and iron oxides.

7. The method of claim 6 wherein said blast furnace filter cake further comprises trace metals including zinc oxide, lead oxide, and mixtures thereof.

8. The slag conditioner of claim 5 wherein said hot slag contains up to 30% CaO.

9. The slag conditioner of claim 5 wherein 2 parts of blast furnace filter cake are used for each part of hot slag.

10. The slag conditioner of claim 4 wherein a maximum of 6,000 lbs. of said slag conditioner are used per heat.

11. The slag conditioner of claim 4 wherein between 2,000 lbs. and 6,000 lbs. of said slag conditioner are used per heat.

* * * * *